(No Model.)
M. L. ADAMS.
FENDER FOR PLOWS.
No. 493,236. Patented Mar. 14, 1893.
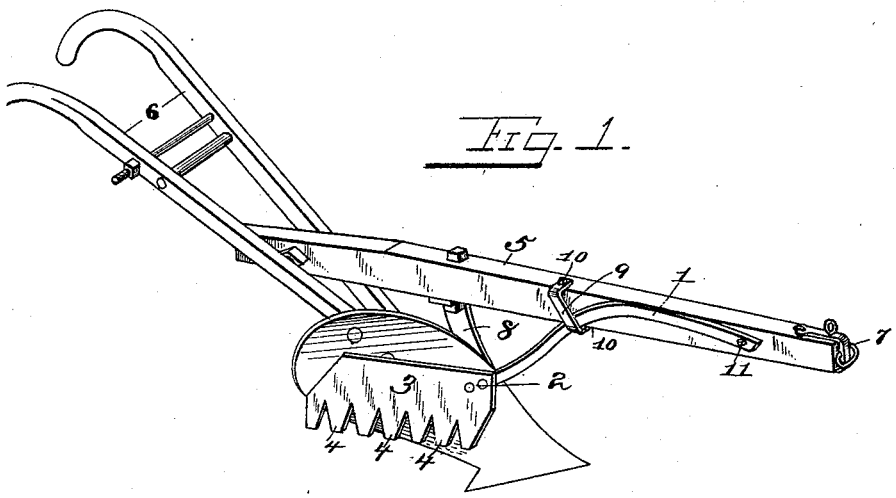
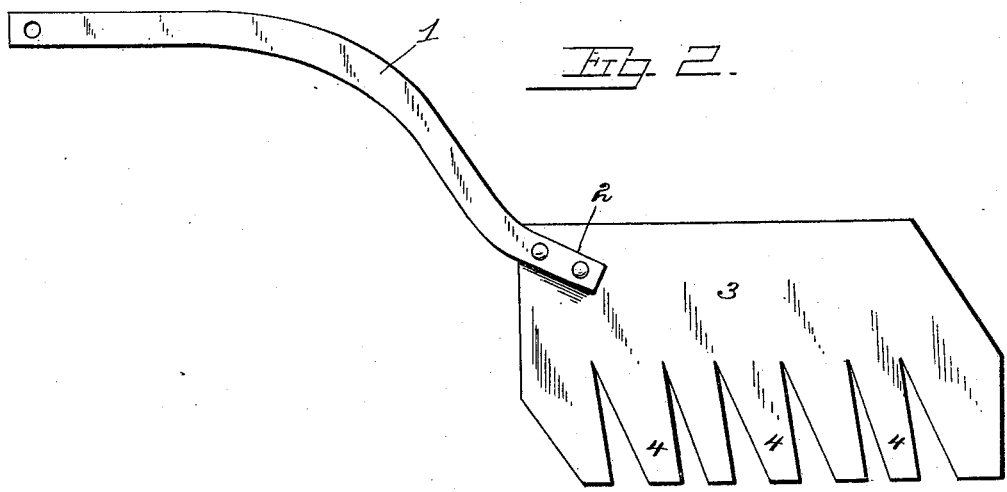
Witnesses
Inventor
Marshall L. Adams
By his Attorneys,

UNITED STATES PATENT OFFICE.

MARSHALL L. ADAMS, OF ELROY, NORTH CAROLINA.

FENDER FOR PLOWS.

SPECIFICATION forming part of Letters Patent No. 493,236, dated March 14, 1893.

Application filed February 26, 1892. Serial No. 422,888. (No model.)

*To all whom it may concern:*

Be it known that I, MARSHALL L. ADAMS, a citizen of the United States, residing at Elroy, in the county of Wayne and State of North Carolina, have invented a new and useful Fender for Plows, of which the following is a specification.

My invention relates to improvements in plows; and has particular reference to an attachment for the same.

The objects in view are to provide a device or fender attachment, adapted to be applied to the beams or stocks of cultivators, and so constructed as to prevent the crushing of small plants undergoing cultivation by heavy clods, thrown up by the cultivator. Furthermore to adapt the fender to automatically adjust itself to the depth of penetration of the cultivator. A final object is to secure these advantages in a cheap and simple manner.

With these objects in view the invention consists in certain features of construction hereinafter specified and particularly pointed out in the claim.

Referring to the drawings:—Figure 1 is a perspective of a plow or cultivator provided with my attachment. Fig. 2 is a detail of the attachment, the reverse side being shown.

Like numerals of reference indicate like parts in all the figures of the drawings.

In constructing the attachment, I employ a compoundly-curved shank or arm 1, formed of a strap of metal; and to the rear portion of the same rivet, as at 2, a sheet-metal apron or fender 3, which depends from the compoundly-curved shank or arm, and has its lower edge provided with a series of cuts or notches forming teeth 4. The said notches or openings are upwardly tapered and terminate at or near the center of the height of the apron, and the teeth 4, which are downwardly tapered, terminate abruptly at their lower ends to prevent them from cutting into the soil, gathering trash, &c., and cause them to travel upon the surface of the former.

In the accompanying drawings, 5 designates an ordinary cultivator or plow-stock, having the usual handles 6, clevis 7 and depending cultivator shovel-carrying standard 8.

In order to prepare the stock or beam 5 for the attachment, a metal strap or keeper 9 of somewhat U-shape has its extremities bolted as at 10 to the upper and lower sides of the beam or stock 5, about midway the points at which the clevis and standard are located. The front end of the shank or arm 1 is passed from the rear forward under the keeper, in which it is allowed to loosely ride, and after being carried forward sufficiently far to bring the fender or apron opposite the shovel, is pivoted at said front end to the stock or beam 5, by a bolt 11. This completes the attachment, and manner of applying the same, and its use will at once be obvious to those engaged in cultivating the soil and manufacture of implements for this purpose. The cultivator may be run close to the crop, and the earth turned by it is deflected against the apron, in lieu of directly over and upon the crop, so that only the finely pulverized soil can pass between the teeth of the fender, and fall at the side of or upon the crop. It will be seen that all clods and other hard unbreakable substances will be prevented by the fender from reaching and crushing the young plants, and will be returned to the furrow from whence they came. By reason of the movability of the shank of arm within the keeper at the side of the stock or beam, it will be seen that the shovel will be permitted to penetrate the soil to any degree desired, and the lower edge of the fender will ride upon the surface of the soil, and automatically adjust itself to such depth of penetration. In order that the fender may thus freely ride over the surface of the soil, its front corner is cut away, as at 12, so as to offer no obstruction to the plow by engaging trash, which under the present formation of the fender will pass thereunder.

It will be seen that my fender, although vertically adjustable, is held from lateral play and strain by the above described keeper, which is carried by a permanent part of the cultivator. Furthermore, the arm or shank of the fender is pivoted directly to the plow-beam in front of the plow-standard, so that the draft upon the fender is substantially horizontal, thereby preventing the "jumping" which would be an objection to a short-armed fender. The inverted V-shaped notches between the teeth of the fender-plate terminate at their upper ends in a line parallel with the lower edge of the plate and at about the center of the height thereof, so that clods of earth when thrown thereagainst by the plow are pulverized and sifted between the teeth. The teeth terminate abruptly at their lower ends in a horizontal line, whereby all of the teeth bear upon the surface of the ground continuously. This prevents stones, clods, &c., from rolling under the fender. Furthermore the front edge of the fender-plate is inclined rearwardly toward its lower end to enable the plate to travel steadily over the surface of the ground without jumping.

Having described my invention, what I claim is—

The combination with a plow, of a vibrating arm loosely pivoted at its front end to the plow-beam, means to limit the vertical and prevent lateral vibration of said arm, and an apron depending from the rear end of the arm, between the plow-shovel and the hill, provided with a rearwardly and downwardly beveled front edge and having at its lower edge downwardly tapered teeth, terminating abruptly at their lower ends to ride upon the surface of the soil, such teeth being separated by intervening, upwardly-tapered notches or openings which terminate at or near the center of the height of the apron and through which the earth, being pulverized by the teeth, is sifted to and upon the hill, substantially as specified.

In testimony that I claim the foregoing as my own I have hereto affixed my signature in the presence of two witnesses.

MARSHALL L. ADAMS.

Witnesses:
W. D. ADAMS,
C. F. HERRING.